(12) United States Patent
Kenghe

(10) Patent No.: US 7,573,832 B2
(45) Date of Patent: Aug. 11, 2009

(54) METHOD AND APPARATUS FOR CONVEYING LINK STATE INFORMATION IN A NETWORK

(75) Inventor: Ambarish Kenghe, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 10/982,717

(22) Filed: Nov. 5, 2004

(65) Prior Publication Data

US 2006/0098581 A1    May 11, 2006

(51) Int. Cl.
*H04L 12/26* (2006.01)
(52) U.S. Cl. .................. 370/252; 370/254; 370/401
(58) Field of Classification Search .............. 370/252, 370/254, 401, 449, 244, 216
See application file for complete search history.

(56) References Cited

U.S. PATENT DOCUMENTS

| | | | | |
|---|---|---|---|---|
| 6,678,241 | B1* | 1/2004 | Gai et al. | 370/216 |
| 7,002,908 | B1* | 2/2006 | Lund et al. | 370/228 |
| 7,184,411 | B2* | 2/2007 | Tucker et al. | 370/252 |
| 2004/0105390 | A1* | 6/2004 | Saksio | 370/245 |
| 2005/0114507 | A1* | 5/2005 | Tarui et al. | 709/224 |
| 2005/0270988 | A1* | 12/2005 | DeHaemer | 370/254 |

* cited by examiner

*Primary Examiner*—Brian D Nguyen

(57) ABSTRACT

Methods and apparatus are disclosed for conveying link state information between ports of a network switch. A switch may be configured to detect whether a link associated with a port of the switch has changed state. If the link has been found to have changed state, such as when the link has failed, this information is conveyed to other ports of the switch. In a preferred embodiment, other links may be reset or flapped in response to such a detection.

8 Claims, 2 Drawing Sheets

METHOD AND APPARATUS FOR CONVEYING LINK STATE INFORMATION IN A NETWORK

BACKGROUND

1. Field of the Disclosure

The disclosure relates generally to conveying link state information to devices connected to a network switch.

2. The Prior Art

Many features on modern PCs and network switches are dependent on link up/down notifications to function properly. For example, a PC running Microsoft Windows® typically sends a DHCP request when the link goes up. Likewise, the switch may perform features such as maintaining DHCP bindings for the PC.

As IP-based devices, such as Voice over IP (VoIP) telephones, become more common in the workplace and home, many of these devices have switches with multiple ports installed in the device itself. For example, a VoIP telephone may include ports for connecting a PC to the network through the phone.

A problem may occur when the switch's host device is externally powered. If a link goes down on the host device, this information may not be communicated to the connected PC as the PC's link will not be reset. Hence, the PC may be unaware that the link status of ports on the device may have changed and will not take any corrective action.

BRIEF DESCRIPTION OF THE DRAWING FIGURES

DETAILED DESCRIPTION

Figure 1:
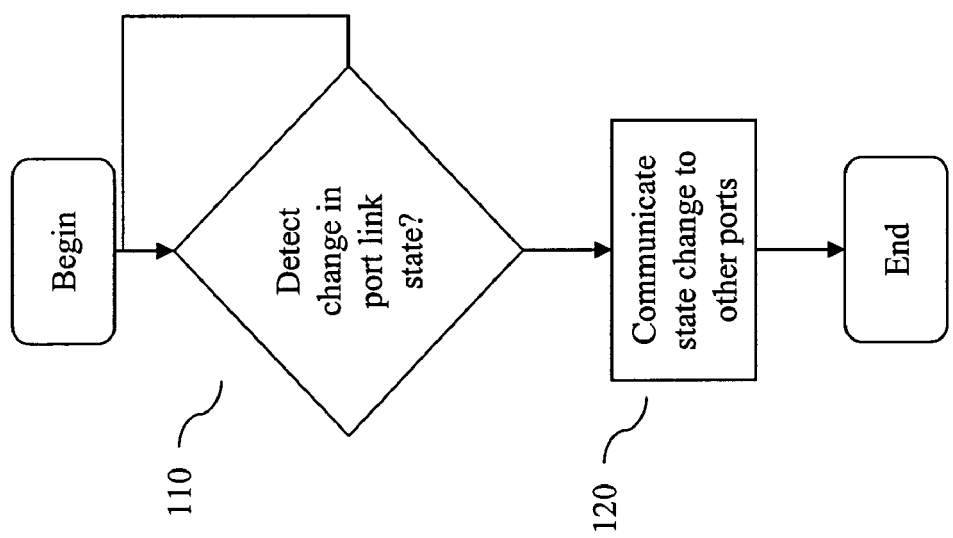
FIG. 1 is a flow diagram of a method for conveying link state information in accordance with the teachings of this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

The present disclosure prevents features and functionality on device attached to a switch from being broken because a link on another port of a switch has changed state. For example, the teachings of this disclosure prevents services on PCs from being broken because a link on the switch, through which the PC is connected, has gone down and the PC is unaware of the link failure. If an associated link on the switch is detected to have failed, the PC's link is made aware of the failure and the PC's link state may be changed, in accordance with this disclosure.

FIG. 1 is a flowchart of a method for conveying link state information in accordance with the teachings of this disclosure. The process begins in query 110, where it is detected whether a link associated with a port of a switch has changed state. If the a link has been found to have changed, such as when a link has failed, moved, or rebooted, this information is conveyed to other ports of the switch as desired by the configuration. In a preferred embodiment, other port links may be reset or flapped in response to such a detection.

Figure 2:
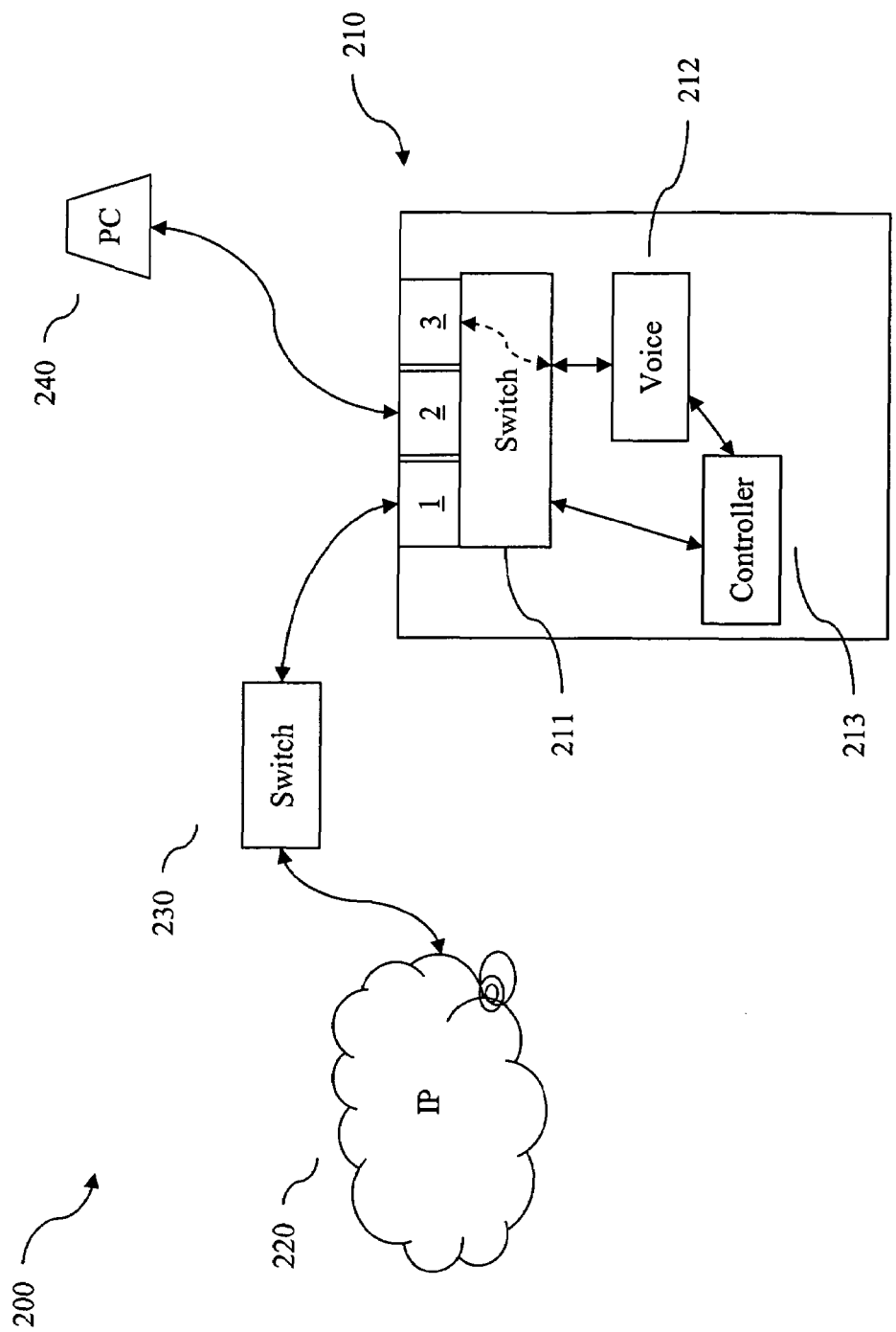
FIG. 2 is diagram of a system configured to convey link state information in accordance with the teachings of this disclosure.

FIG. 2 is conceptual diagram of exemplary structure for performing embodiments of this disclosure. FIG. 2 shows a system 100 including a VoIP telephone 210 coupled to a network 220 through an enterprise switch 230. It is contemplated that enterprise switch 230 may comprise of wide variety of switch capabilities depending on the network configuration desired. For example, if network 220 comprises an IP network such as the Internet, then switch 230 may include VoIP gateway functionality.

The VoIP telephone 210 includes a switch 211 including three ports labeled 1, 2, and 3. In a typical implementation, port 1 is coupled to the enterprise switch 230, port 2 is coupled to a PC 240, and port 3 is utilized internally as part of the voice functionality 213 of the phone. The phone 210 includes a controller 212 having a processor and associated memory for controlling the operation of the device in accordance with the teachings of this disclosure. It is to be understood that other port configurations are possible without departing from the scope of the present disclosure. Additionally, although the system of FIG. 2 shows the VoIP phone providing network connectivity to a PC, it is to be understood that the teachings of this disclosure may be applied to any device that provides network connectivity to other devices.

In operation, the PC 240 accesses the network 220 by communicating through port 2 of the phone, and upstream through the phone's link to the switch through port 1. In a situation where the phone 210 is externally powered, a scenario may arise where the state of the link between the phone and switch (port 1) changes. For example, the link to the switch may be moved to a new port, or the switch may reboot, causing the link state of port 1 to change state, but not affecting the state of port 2.

As is known by those of ordinary skill in the art, the link state on both the sides of a link is typically kept in sync. Thus, if the link goes down on one side, then it will also go down on the other end as well. However, in the system of FIG. 2, the PC requires two links on separate ports in order to co-exist with the phone.

To communicate the link state of port 1 to the PC coupled to port 2, the controller 212 of the phone is configured to determine when the link state of a port in switch 211 has changed. The controller monitors the state all of the ports associated with the host switch, and then transfers link state information from one port to another (or to multiple ports) depending on the configuration.

In the example of FIG. 2, the link between the phone and the enterprise switch is of key interest, as the PC depends on the state of this link to provide services for the PC.

When the controller detects that the link corresponding to one port has changed, the controller will change the links corresponding to other ports. In one embodiment, the controller of the host device may simply change the port state of ports hosted by the device. By so changing the state of the port, the link state change will be reflected in any device connected to that port.

It is contemplated that the controller can detect a link state by detecting an interrupt generated in response to a link state change, or by polling the state of various links.

Hence, in the example of FIG. 2, if the link between the phone and the switch changes state, the controller, after detecting this change, will then reset, or flap, the link between the PC and the phone. In so doing, the controller thus communicates the fact that a link has changed state on a link of interest to the PC. The PC will then re-sync its link side, thus preserving any services dependent on the link that went down.

As will now be appreciated, the controller may be configured to examine predefined ports for changes in link state, and communicate any changes of link state to ports that have devices connected that have services depending on having information regarding the current state of the links of interest. Hence, one benefit of the present disclosure is that the state of one port is reflected to other ports in the system in the event of a state change, thereby propagating changes in link state to other ports in the switch. By doing this, a device connected to a port that has not changed state may be notified of a state change in another port of the switch. It is also contemplated that link state change information may be conveyed in a predetermined direction, such as from port 1 to port 2, but not from port 2 to port 1.

Though the system of FIG. 2 is shown as having a switch disposed within the VoIP, it is contemplated that the teachings of this disclosure may be applied to standalone switches. In this case, the switch's controller may be configured to detect state changes, and communicate any changes to other ports in the switch.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method, comprising:
   detecting a change in a link state of one of a plurality of ports in a network switch, where detecting the change in the link state includes examining a set of pre-defined ports for changes in link state; and
   communicating the change in the link state to at least one of the plurality of ports in the network switch with a service that depends on having an up-to-date link state for the set of pre-defined ports.

2. The method of claim 1, where communicating the change in the link state comprises resetting at least one of the plurality of ports in the network switch.

3. The method of claim 2, where the change in the link state is to be detected by detecting an interrupt associated with the port.

4. The method of claim 2, where the change in the link state is to be detected by polling the plurality of ports.

5. An apparatus, comprising:
   a network switch having a plurality of ports, the switch being configured to detect a change in the link state of one of the ports, where detecting the change in the link state includes examining a set of pre-defined ports for changes in link state; and
   to communicate the detection of the change in the link state to at least one of the plurality of ports associated with a service that depends on having an up-to-date link state for the set of pre-defined ports.

6. The apparatus of claim 5, where the switch is configured to reset at least one of the ports in the switch.

7. The apparatus of claim 6, where the switch is configured to detect an interrupt associated with a port.

8. The apparatus of claim 6, where the switch is configured to poll the plurality of ports of the switch.

* * * * *